No. 725,766. PATENTED APR. 21, 1903.
H. M. POPE.
VEHICLE.
APPLICATION FILED AUG. 11, 1900.
NO MODEL. 2 SHEETS—SHEET 1.
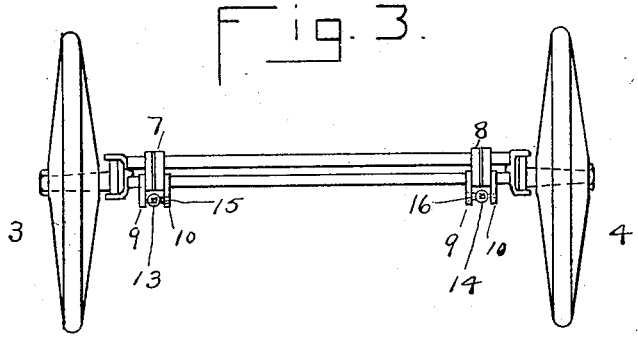
Witnesses:
Inventor.
Harry M. Pope

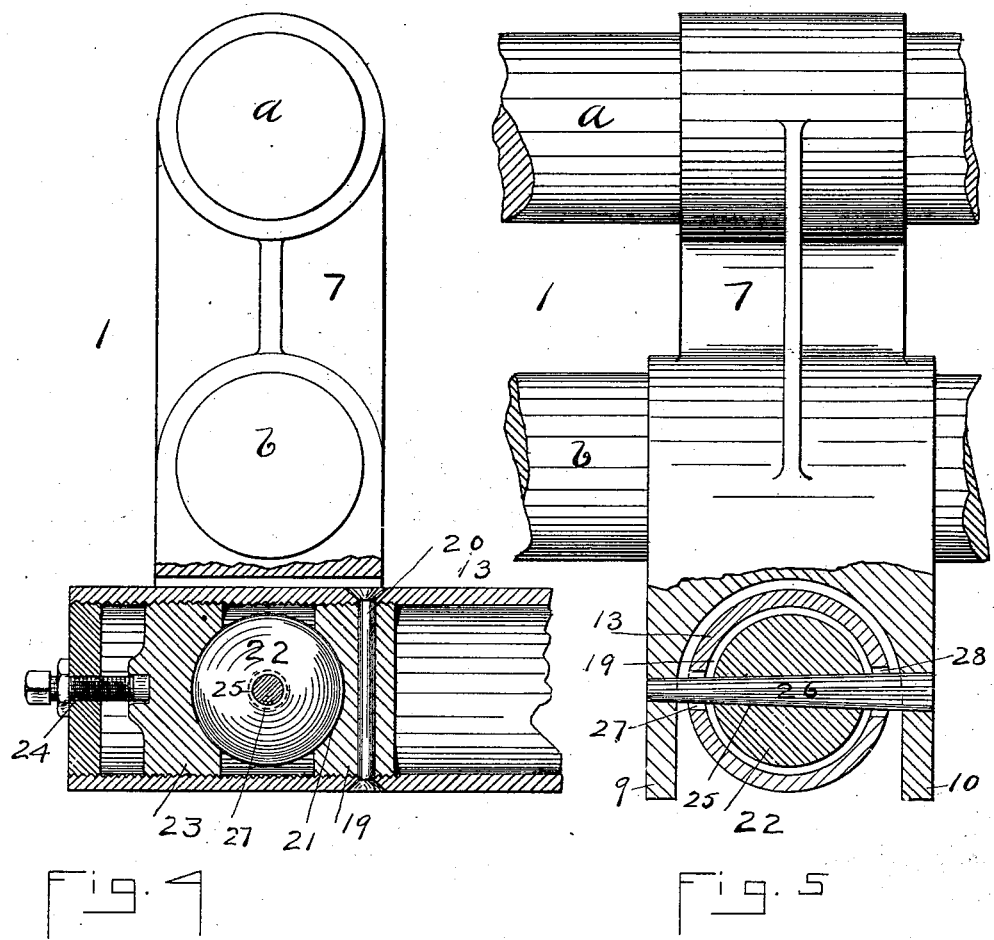

UNITED STATES PATENT OFFICE.

HARRY M. POPE, OF HARTFORD, CONNECTICUT.

VEHICLE.

SPECIFICATION forming part of Letters Patent No. 725,766, dated April 21, 1903.

Application filed August 11, 1900. Serial No. 26,565. (No model.)

*To all whom it may concern:*

Be it known that I, HARRY M. POPE, a citizen of the United States, and a resident of Hartford, in the county of Hartford and State of Connecticut, have invented certain new and useful Improvements in Vehicles, of which the following is a specification.

The object of my invention is to improve the construction of the running-gear frame of vehicles and is accomplished in the manner hereinafter described, reference being had to the drawings illustrating the preferred form of embodiment of my invention, in which—

Figure 1 is a bottom plan view of a running-gear frame. Fig. 2 is a side view of the same. Fig. 3 is a front view of the same. Fig. 4 is a detail view, in side section, on lines X X, Fig. 1, showing the means employed for uniting the parts of the frame. Fig. 5 is a sectional end view of the same on lines Y Y, Fig. 1.

Referring to the drawings, 1 denotes the front axle, shown in the drawings as being made up of two members *a b*, and 2 is the rear axle.

3, 4, 5, and 6 are the wheels of the vehicle, supported at the ends of the axle in any desired manner.

7 8 are couplings uniting the members *a b* of the front axle 1, cut away to form supporting-ears 9 10, to which the reaches are attached. On the rear axle are located rings *c d*, having ears 11 12 similar to the ears 9 10 on the couplings 7 8. It will be observed, however, that the ears in all cases depend from the axles, so that the universal couplings, next to be described, are located below the axles and pendent therefrom. This brings the reaches into a plane lower than that of the axles, and hence the superstructure is supported in such manner as to reduce to a minimum the danger of overturning the vehicle. Extending between the axles are the reaches 13 14, preferably of tubular construction, forming, with the axles, a rectangular frame, said reaches being connected with the axle by means of universal couplings, as at 15 16 17 18. In constructing this universal coupling I locate in the interior of the tubular reaches 13 14, near their ends, a bearing-plate 19, holding it in position by means of a dowel-pin 20, thread, or any suitable device. In the face of this bearing-plate I form a cup-shaped bearing-surface 21. I then insert the bearing-ball 22 and screw up against it a second bearing-plate 23, holding it in position in any desired manner, as by the bolt 24 shown in the drawings. Through the bearing-ball is formed a tapered hole 25 to receive a tapered pin 26, the reach having holes 27 28 formed through its wall larger than the tapered pin 26 and permitting its passage therethrough. As shown in the drawings, and more especially in Fig. 5, the pin is tapered where it passes through the ball, and it may even be tapered throughout its length, as there illustrated. The end of the reach is placed between the ears 9 10, the pin passed through the hole in one ear 10, driven tightly into the ball 22, and then forced into the other ear 9. This construction is used at all the connecting points of the frame. The holes through the walls of the reaches are enough larger than the pins to permit of a sufficient amount of movement without cramping the members of the frame.

In some cases it may be advisable to use only two universal couplings, arranged at diagonally opposite corners of the rectangular frame, although the construction described above is thought to be preferable.

By connecting the members of the running-gear frame with universal couplings, as described, the utmost freedom of movement of the parts is obtained without the least cramping or straining of the frame, and when the vehicle is used on rough roads the frame readily adapts itself to the inequalities of the surface of the road.

The reaches are intended to keep the axles always at an unvarying distance from each other, while allowing them a free vertical movement without in any way cramping or binding the joints or twisting the frame members.

It is evident that changes in construction and the arrangement of the parts of my invention can be readily made to suit the requirement of different conditions, and it is my intention to include all of such changes herein.

Having now described my invention, what I claim as new, and desire to secure by Letters Patent, is—

1. In a running-gear frame for vehicles, the combination with two reaches, the axles, and a pair of spaced ears near each end of the axles between which extend the ends of the reaches; of a universal coupling at each connecting point, the same consisting of a tapered pin connecting the pair of ears and between them passing loosely through holes in the reach, bearing-surfaces within the latter, and a ball within the reach between said surfaces and through and into which the pin fits tightly.

2. In a running-gear frame for vehicles, the combination with two reaches, the axles, and a pair of spaced ears near each end of the axles between which extend the ends of the reaches; of a universal coupling at each connecting point, the same consisting of a pin connecting the pair of ears and between them passing loosely through holes in the reach, a cup-shaped bearing-plate within the latter, a second bearing-plate adjustable within the reach, and a ball between these plates through and into which the pin fits tightly.

3. In a running-gear frame for vehicles, the combination with two reaches, the axles, and a pair of spaced ears near each end of the axles between which extend the ends of the reaches; of a universal coupling at each connecting point, the same consisting of a tapered pin connecting the pair of ears and between them passing loosely through holes in the reach, a cup-shaped bearing-plate within the latter, a second bearing-plate also within the reach adjacent its extremity, a bolt for adjusting this plate, and a ball between these plates through and into which the pin fits tightly.

4. In a running-gear frame for vehicles, the combination with two side reaches having tubular extremities, bearings within the latter, and balls held within the bearings; of a front axle made up of two members, couplings uniting these members and cut away at their lower ends to form spaced ears, a rear axle, devices depending therefrom and having similar pairs of ears, and a transverse pin through each pair of ears, passing loosely through the extremity of a reach, and passing through and fitting snugly in the ball within such reach.

5. In a running-gear frame for vehicles, the combination with two side reaches having tubular extremities, bearings within the latter, and balls held within the bearings; of a front axle made up of two members, couplings uniting these members and cut away at their lower ends to form ears, a rear axle, rings surrounding the latter and also cut away at their lower ends to form pairs of spaced ears, and a transverse pin through each pair of ears, passing loosely through the extremity of a reach, and passing through and fitting snugly in the ball within such reach.

6. The combination in a running-gear frame for vehicles, with the axles having supporting-ears arranged thereon, and reaches extending between said axles; of universal couplings located at the ends of the reaches comprising a bearing-ball retained between bearing-surfaces, and a pin passing through the supporting-ears and said bearing-ball, substantially as described.

7. The combination in a running-gear frame for vehicles, with the axles having supporting-ears arranged thereon, and reaches extending between said axles; of universal couplings located at the ends of the reaches comprising a bearing-ball retained between bearing-surfaces, and a pin passing through the supporting-ears and said bearing-ball, the pin passing loosely through holes in the reach at each side of the ball and being wedged tightly into the latter where it passes through it, substantially as described.

Signed this 8th day of August, 1900, at Hartford, Connecticut.

HARRY M. POPE.

Witnesses:
MORSE SMITH,
H. E. HART.